United States Patent Office 3,237,338
Patented Mar. 1, 1966

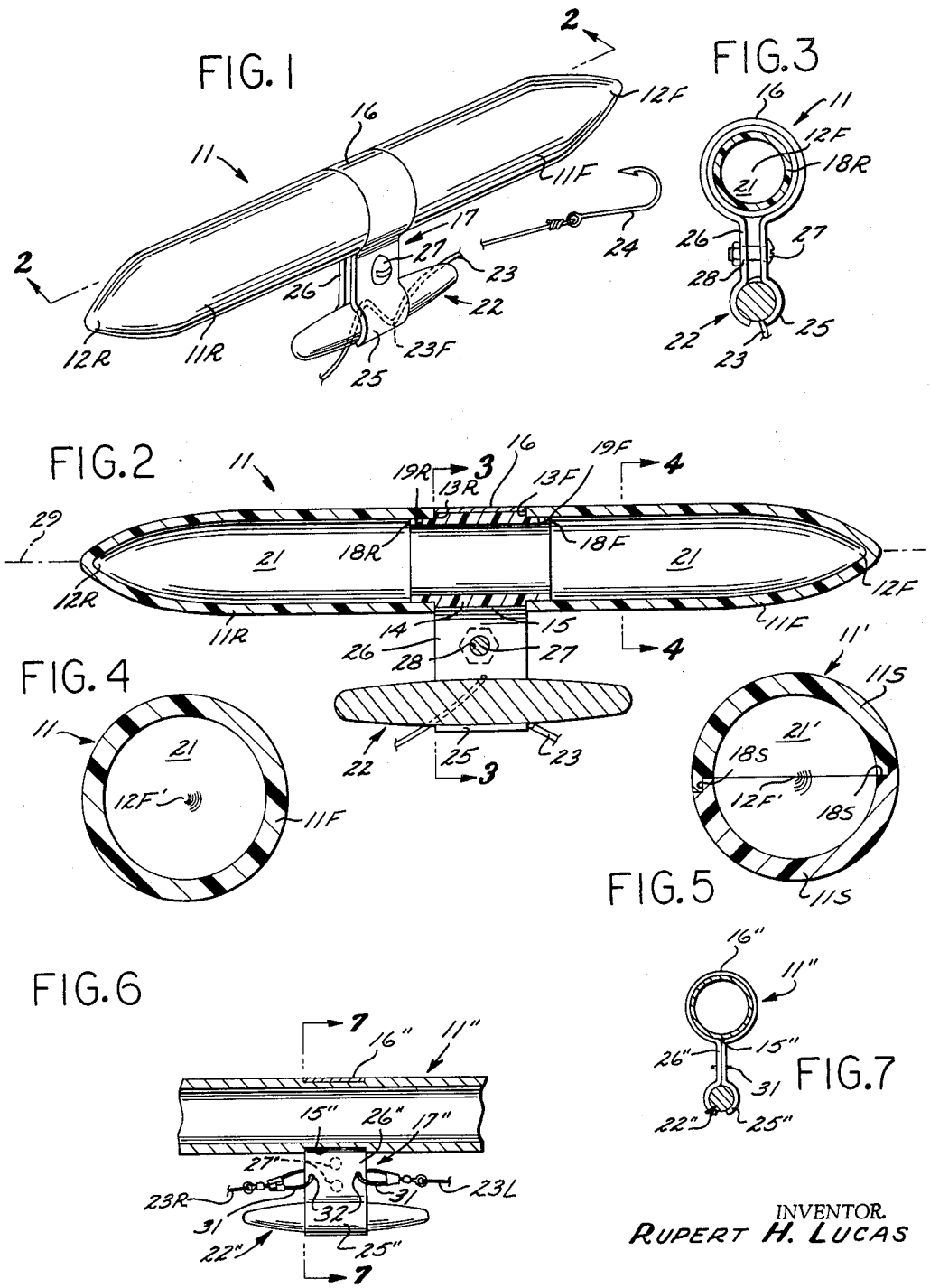

3,237,338
CASTING FLOAT FOR A FISHING LINE
Rupert H. Lucas, 412 N. Lowell St.,
Elsinore, Calif. 92330
Filed July 16, 1964, Ser. No. 383,164
6 Claims. (Cl. 43—43.1)

Generally speaking, the present invention relates to a casting float for a fishing line and, more particularly, pertains to such a casting float for a fishing line which is effectively provided with a substantial mass which may be said to effectively comprise and define a casting weight heavy enough to facilitate a long-range casting operation from a relatively short stiff fishing pole and from a fishing reel having a relatively high drag factor, such as are used when fishing for a relatively strong, hard-fighting fish such as albacore, barracuda, or the like.

It should be noted that the casting float of the present invention comprises a buoyant float member which has an effective average density less than the volume of water adapted to be displaced thereby when floating at, or adjacent to, the top of a body of water into which the casting float is cast when fishing, whereby to effectively exert an upward buoyant force substantially equal and opposite to the downward force produced by gravity acting on the substantial mass of said casting weight whereby to cause the buoyant float member to float in a selected relationship at, or adjacent to, the top of said body of water.

In other words, it may be said that, in order to make it possible to cast a fishing hook and bait a substantial distance when using heavy-duty fishing equipment of the type referred to above, the casting float of the present invention is provided with the above-mentioned casting weight having the above-mentioned various substantial mass. This makes such a long-range casting operation possible, when using such heavy-duty fishing equipment for the type of fishing indicated above.

However, it should be noted that if such a heavy casting weight is employed without effective neutralization thereof by the buoyant float member of the present invention, said casting weight and the fish hook and bait positioned forwardly thereof a preselected or predetermined distance, will normally be caused to submerge and drop very substantially below the surface of the body of water and, in some cases, completely to the bottom thereof when fishing in relatively shallow water. This would very seriously handicap a fisherman who might be fishing for fish characterized by their tendency to strike or to take the hook and bait only when very closely adjacent to, or at, the top surface of the body of water (or a short distance therebelow).

For example, albacore, barracuda, and a number of other fish have the above-mentioned tendency, and in order to optimize a fisherman's chances when fishing for such fish, it is necessary that the hook and bait remain either at, or very close to, the top surface of the body of water. This is made possible by the novel casting float of the present invention because of the fact that the buoyant float member, as mentioned above, exactly counteracts the substantial mass of the casting weight whereby to cause the casting float to effectively float in a predetermined relationship with respect to the top surface of water (usually at, or very closely adjacent to, said water surface), such as by partial submersion therein.

Since the casting float will normally be effectively connected with respect to a fishing line at a preselected distance back of the hook and bait (usually by leader means effectively comprising the forward end portion of the fishing line), this will positively determine the position of the fishing hook and bait.

If said fishing hook, bait, and fishing line leader portion are substantially heavier than water and if they are allowed to remain at rest with respect to the surface of the body of water after a casting operation, the fishing hook and bait will sink below the top surface of the water a distance determined by the length of the portion of the fishing line or leader between the novel casting float of the present invention and the hook. It can sink no farther than said distance, which can be preselected by connecting the casting float at a preselected distance from the fishing hook to bring about optimum positioning of the hook and bait.

If, however, the fish hook, bait, and front portion or leader of the fishing line between the casting float and the hook are not allowed to remain at rest with respect to the body of water after completion of a casting operation, but are drawn through an upper portion of the body of water, it will be found that the position of the hook and bait will be somewhat higher than in the static nonmoving example described just previously, and this can be arranged by correlating the rate of movement through the body of water with the selected length of the front portion of the fishing line or leader between the casting float and the hook whereby to bring about an optimum positioning of the fish hook and bait with respect to the top surface of the body of water.

On the other hand, if the hook and bait are relatively light and if the front portion of the fishing line or leader between same and the casting float are also relatively light, or if said elements are substantially buoyant, they will float or be positioned either at, or very closely adjacent to, the top surface of the body of water and will not be drawn thereunder by the heavy casting weight because of the effective neutralization thereof by the buoyancy of the buoyant float member.

With the above points in mind, it is an object of the present invention to provide a novel casting float for a fishing line, of the character referred to herein generically and/or specifically and including any or all of the features referred to herein, either individually or in combination, and which is of extremely simple, inexpensive construction requiring a minimum of tooling and/or production costs and which is capable of mass manufacture at an extremely low cost per unit whereby to be conducive to widespread manufacture, distribution, and use of the invention.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments are illustrated in the hereinbelow-described figures of the accompanying single drawing sheet and are described in detail hereinafter.

FIG. 1 is a three-dimensional view of one exemplary embodiment of the present invention.

FIG. 2 is an enlarged longitudinal central sectional view taken in the direction of the arrows 2—2 of FIG. 1.

FIG. 3 is a cross-sectional view of the complete exemplary first form of the invention taken on a plane such as that indicated by the arrows 3—3 of FIG. 2.

FIG. 4 is an enlarged cross-sectional view of the complete exemplary first form of the invention taken on a plane such as that indicated by the arrows 4—4 of FIG. 2.

FIG. 5 is a cross-sectional view generally similar to FIG. 4 and taken on a similar plane, but illustrates a slight modification of the invention wherein the buoyant float member is differently constructed from the first form of the invention shown in FIGS. 1–4.

FIG. 6 is a fragmentary central view generally similar to the central portion of FIG. 2.

FIG. 7 is a cross-sectional view of the complete modified form of the invention fragmentarily illustrated in FIG. 6, taken on a plane such as that indicated by the arrows 7—7 of FIG. 6.

Generally speaking, the exemplary first form of the present invention illustrated in FIGS. 1–4 may be said to comprise a hollow elongated buoyant float member, indicated generally at 11, which, in said exemplary first form of the invention, is shown as comprising two hollow substantially tubular end parts which might be called front and rear substantially tubular end parts 11F and 11R, respectively, and which have corresponding outer or front and rear closed conically tapered forward and rearward closure end portions 12F and 12R, respectively. It will be noted that the front and rear buoyant float member parts 11F and 11R have open central inner ends 13F and 13R, respectively, which are longitudinally spaced apart and effectively provided therebetween with a reduced-diameter tubular junction sleeve 14 rigidly cemented thereto and rigidly interconnecting same and, by reason of being of smaller or reduced diameter, effectively providing an outer circumferential recess 15 adapted to receive and mount the upper clamping portion 16 of an attachment or clamp means generally indicated at 17 which will be described in detail hereinafter.

It should be noted that, in the exemplary first form of the invention illustrated, opposite ends of the reduced-diameter tubular junction sleeve 14 are provided with effective nipple means, as indicated at 18F and 18R, respectively, which are adapted to extend into and to be cemented with respect to corresponding inner surfaces 19F and 19R of the corresponding central inner ends 13F and 13R, respectively, of the front and rear buoyant float member parts 11F and 11R, respectively. In the event that said elements are made of plastic, as illustrated in FIGS. 1–4, the junction of the nipples 18F and 18R with respect to the central inner ends 13F and 13R may be effected by adhesive means, cohesive means, or appropriate mechanical fastening means. As exemplary of a few such fastening arrangements, it might be noted that solvent or adhesive material might be applied to the joining elements for effecting a strong cohesive or adhesive junction, or heat-sealing means may be applied thereto for effecting a strong junction of the three elements of the buoyant float member indicated generally at 11.

In any event, said junction, in addition to rigidly fastening the three elements of the buoyant float member 11 together, must also effectively sealingly join same so as to effectively isolate the hollow interior chamber 21 within the hollow buoyant float member 11 from the exterior thereof. Normally, said interior chamber 21 will be filled with air. However, it may be filled with various gases or, in certain forms of the invention, may be evacuated. In any event, it provides an arrangement which effectively reduces the average density of the complete buoyant float member 11 to a value substantially less than that of an equal volume of water whereby to effectively produce a net upward buoyant force which is a function of the extent of submersion of the buoyant float member 11, ranging from very slight submersion thereof through an intermediate degree of submersion thereof up to the complete submersion thereof.

In the exemplary first form of the invention illustrated, the buoyant float member 11, of course, has a certain mass of its own which arises from the volume and density of the material forming the buoyant float member 11. However, this weight is not sufficient to make possible the ideal maximum long casting operations which a fisherman might desire. Therefore, the buoyant float member is effectively provided with a casting weight having a substantial mass sufficient to facilitate a long-range casting operation even when made from a short stiff heavy-duty fishing pole and when the rear end of the fishing line is carried by a large heavy-duty fishing reel having a relatively high drag factor.

One exemplary form of such a casting weight is generally designated by the reference numeral 22 in the exemplary first form of the invention illustrated, and is shown as comprising a lead sinker of substantial mass, which is adapted to be controllably removably carried by the attachment means or clamp means 17 in a fixed depending relationship under the buoyant float member 11 and adapted to be carried in a selected relationship with respect to a fishing line forward portion or leader portion 23 at a selected distance from the fish hook, such as is shown at 24 in FIG. 1, which is adapted to be carried at the front end of said forward fishing line portion or leader 23.

In the exemplary first form of the invention illustrated, the fishing line forward portion or leader portion 23 is effectively locked, both with respect to the casting weight or sinker 22 and with respect to the attachment means or clamp 17, by effectively looping, winding, or wrapping a fastening portion 23F of said fishing line or leader 23 around the exterior of a central portion of the casting weight or sinker 22 with said fastening portion 23F effectively locked between the exterior of the casting weight or sinker 22 and the interior of the lower clamping portion 25 of the attachment or clamp means indicated generally at 17. This provides one very effective means for locking the fishing line or leader portion 23 relative to the sinker 22, the attachment or clamp means 17, and the buoyant float member 11, as is clearly shown in FIGS. 1, 2, and 3. However, certain forms of the invention contemplate various other types of fastening of the weight and/or the fishing line or leader portion relative to the buoyant float member and all such are intended to be included and comprehended herein.

In the exemplary first form of the invention illustrated, the hereinbefore-mentioned attachment or clamp means 17 effectively includes the upper clamping portion 16 previously referred to as being clampingly positioned within the annular recess 15 around the middle of the buoyant float member 11, the bifurcated or split lower clamping portion 25 just described as adapted to be clamped around the exterior of the central part of the casting weight or sinker 22 and the fastening portion 23F of the fishing line or leader 23, and also includes two intermediate connection members 26 provided with fastening means indicated at 27 adapted to be controllably fastened to any desired degree whereby to correspondingly control the clamping engagement of both the upper clamping portion 16 relative to the central part of the buoyant float member 11 and to control the clamping engagement of the lower bifurcated clamping means 25 around the exterior of the casting weight or sinker 22.

In the exemplary first form of the invention illustrated, said fastening means 27 is illustrated as comprising fastening means in the form of threadedly engaged bolt and nut means, indicated by said reference numeral 27, and adapted to be carried in a pair of laterally directed apertures 28 carried by the spaced intermediate members 26.

In FIG. 2, the top surface of a body of water is indicated in broken lines at 29. However, it should be noted that this is not to be construed as limiting the invention since the extent of submersion of the buoyant float member 11 will vary depending upon the mass of the casting weight or sinker 22. If it is less than shown in FIG. 2, the buoyant float member 11 will ride higher out of the water surface 29, while if said weight is greater than that of the showing of FIG. 2, said buoyant flat member 11 will be submerged to a greater extent relative to the top surface 29 of the body of water. In other words, said showing is merely illustrative.

FIG. 5 is a cross-sectional view generally similar to FIG. 4, but illustrates a modified form of the invention. Therefore, corresponding parts are indicated by similar reference numerals, primed, however. In this modification it should be noted that the modified buoyant float member indicated generally at 11' is not divided at the center into forward and rear parts such as shown at 11F and 11R in FIGS. 1 and 2 and joined together by an intermediate reduced-diameter sleeve such as shown at 14 in FIG. 2. Instead, in the modification of FIG. 5, the buoyant float member 11' comprises two laterally adjacent mating side parts having closed outer convex surfaces as indicated at 11S and having open inner junction edges 18S effectively and sealingly joined together along the lengths thereof whereby to define said hollow substantially tubular buoyant float member 11'.

It should be noted that said longitudinal junction edges 18S are of the stepped shoulder type as shown in FIG. 5 and may be joined together in any of the manners previously described with respect to the junctions of the forward and rear nipples 18F and 18R relative to the central ends 13F and 13R, respectively, of the forward and rear parts 11F and 11R, respectively, of the first form of buoyant float member 11 illustrated in FIGS. 1-4 and described in detail hereinbefore. Therefore, said sealing arrangement, and the various forms thereof, will not again be described with respect to the longitudinal junction edges 18S.

In other respects, this modified form of the invention is substantially similar to the first form of the invention illustrated in FIGS. 1-4 and described in detail hereinbefore.

FIGS. 6 and 7 illustrate a further modification of the invention and, therefore, similar parts are indicated by similar reference numerals, doubly primed, however. In this modification, it will be noted that the hollow elongated buoyant float member 11" is made of metal, preferably a lightweight metal, and is formed as one continuous or integral hollow buoyant float member 11". In other words, it is not divided into a front and rear part and an intermediate sleeve in the manner of the first form of the invention illustrated in FIGS. 1-4, nor is it divided into two laterally mating parts in the manner of the modified form of the invention illustrated in FIG. 5. It also has a slightly modified type of attachment or clamp means 17".

The upper clamping portion 16" thereof clamps around the reduced-diameter annular central junction portion 15" of the buoyant float member 11" in a manner similar to the first form of the invention. However, the lower clamping portion 25" of the attachment or clamp means 17" is slightly different from the first form of the invention in that it permanently clamps the casting weight means or sinker 22" and is held in said permanently clamped relationship by the spot weld means 27" (or by other substantially equivalent fastening means).

In this arrangement, the buoyancy of the float member 11" and the mass of the casting weight or sinker 22" are initially selected to provide the desired net buoyancy characteristic for the entire device and in this form of the invention, the effective attachment of the device relative to a fishing line or leader portion is somewhat different from that illustrated in FIGS. 1-4 showing the first form of the invention in that the fishing line is broken into two parts comprising a forward leader portion 23L and a rear fishing line portion 23R. Each of said fishing line and/or leader portions 23L and 23R is controllably connectable with respect to the intermediate portions 26" of the modified attachment or clamp means 17" by way of controllably openable and closable resilient snap fastener or hook means 31 which are adapted to removably engage corresponding apertures 32. This makes it possible to connect the rear portion of the fishing line 23R to the modified attachment or clamp means 17" and to connect various different lengths of fishing line leader portion 23L thereto as determined by the optimum requirements for various different types of fishing. It should be noted that various other attachment means may be employed in lieu of the resilient snap fastener or hook means 31.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A casting float for a fishing line, comprising: a buoyant float member provided with attachment means for attaching said float member with respect to a fishing line at an optimum distance from fishing hook means adapted to be carried at a forward end thereof, said attachment means also being cooperable for attaching said float member with respect to an auxiliary casting weight having a substantial mass sufficient to facilitate a long-range casting operation, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water, said attachment means comprising clamp means having an upper clamping portion clamped around said buoyant float member and having a lower clamping portion adapted to be effectively clamped around said auxiliary casting weight and fastened with respect to a selected engagement portion of said fishing line for relative locking immobilization of said engagement portion of said fishing line with respect to said clamp means and said auxiliary casting weight.

2. A casting float for a fishing line, comprising: a buoyant float member provided with attachment means for attaching said float member with respect to a fishing line at an optimum distance from fishing hook means adapted to be carried at a forward end thereof, said attachment means also being cooperable for attaching said float member with respect to an auxiliary casting weight having a substantial mass sufficient to facilitate a long-range casting operation, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water, said buoyant float member comprising a hollow elongated member defining a hollow interior chamber therein which acts to reduce the effective average density of the complete float member to said value substantially less than that of the volume of water displaced thereby, said hollow elongated buoyant float member comprising two substantially similar hollow end parts having closed end portions at the outer ends thereof and having open central inner end portions at the inner ends thereof provided with a central junction sleeve portion sealingly interconnecting same whereby to define said hollow elongated buoyant float member, said attachment means comprising clamp means having an upper clamping portion clamped around said buoyant float member and having a lower clamping portion adapted to be effectively clamped around said auxiliary casting weight and fastened with respect to a selected engagement portion of said fishing line for relative locking immobilization of said engagement portion of said fishing line with respect to said clamp means and said auxiliary casting weight, said central junction sleeve portion being of reduced lateral width in a manner providing an outer recess of reduced lateral width receiving and mounting said upper clamping portion of said clamp means therein in a position extending substantially around said reduced lateral width junction sleeve portion.

3. A casting float for a fishing line, comprising: a buoyant float member provided with attachment means for attaching said float member with respect to a fishing line at an optimum distance from fishing hook means adapted to be carried at a forward end thereof, said attachment means also being cooperable for attaching said float member with respect to an auxiliary casting weight having a substantial mass sufficient to facilitate a long-range casting operation, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water, said buoyant float member comprising a hollow elongated member defining a hollow interior chamber therein which acts to reduce the effective average density of the complete float member to said value substantially less than that of the volume of water displaced thereby, said hollow elongated buoyant float member comprising two substantially similar hollow laterally adjacent mating side parts having closed outer side surface portions at the outer sides thereof and having open inner junction edges at the inner sides thereof effectively rigidly sealingly joined together along the lengths thereof whereby to define said hollow elongated buoyant float member, said attachment means comprising clamp means having an upper clamping portion clamped around said buoyant float member and having a lower clamping portion adapted to be effectively clamped around said auxiliary casting weight and fastened with respect to a selected engagement portion of said fishing line for relative locking immobilization of said engagement portion of said fishing line with respect to said clamp means and said auxiliary casting weight, said hollow elongated buoyant float member having a central portion of reduced lateral width in a manner providing an outer recess of reduced lateral width receiving and mounting said upper clamping portion of said clamp means therein in a position extending substantially around said reduced lateral width junction portion.

4. A casting float for a fishing line, comprising: a buoyant float member provided with attachment means for attaching said float member with respect to a fishing line at an optimum distance from fishing hook means adapted to be carried at a forward end thereof, said attachment means also being cooperable for attaching said float member with respect to an auxiliary casting weight having a substantial mass sufficient to facilitate a long-range casting operation, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water, said buoyant float member comprising a hollow elongated member defining a hollow interior chamber therein which acts to reduce the effective average density of the complete float member to said value substantially less than that of the volume of water displaced thereby, said hollow elongated buoyant float member being of substantially integral construction along the length thereof and along the width thereof whereby to define said hollow elongated buoyant float member in the form of a unitary structure, said attachment means comprising clamp means having an upper clamping portion clamped around said buoyant float member and having a lower clamping portion adapted to be effectively clamped around said auxiliary casting weight and fastened with respect to a selected engagement portion of said fishing line for relative locking immobilization of said engagement portion of said fishing line with respect to said clamp means and said auxiliary casting weight, said hollow elongated buoyant float member having a central portion of reduced lateral width in a manner providing an outer recess of reduced lateral width receiving and mounting said upper clamping portion of said clamp means therein in a position extending substantially around said reduced lateral width junction portion.

5. A casting float for a fishing line, comprising: a buoyant float member provided with attachment means for attaching said float member with respect to a fishing line at an optimum distance from fishing hook means adapted to be carried at a forward end thereof, said attachment means also being provided with an auxiliary casting weight in the form of a sinker of substantial mass effectively attached with respect to said buoyant float member immediately thereunder by said attachment means, said attachment means comprising clamp means having an upper clamping portion effectively clamped around said buoyant float member and having a lower clamping portion effectively clamped around said casting weight and a selected engagement portion of said fishing line with said selected engagement portion of said fishing line effectively wrapped around the exterior of said casting weight between same and an interior surface of said lower portion of said clamp means for relative locking immobilization of said engagement portion of said fishing line with respect to said clamp means and said casting weight, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water.

6. A casting float for a fishing line, comprising: a buoyant float member provided with attachment means for attaching said float member with respect to a fishing line at an optimum distance from fishing hook means adapted to be carried at a forward end thereof, said attachment means also being provided with an auxiliary casting weight in the form of a sinker of substantial mass effectively attached with respect to said buoyant float member immediately thereunder by said attachment means, said attachment means comprising clamp means having an upper clamping portion effectively clamped around said buoyant float member and having a lower clamping portion effectively clamped around said casting weight for relative locking immobilization of said clamp means and said casting weight, said attachment means being effectively provided with fastening means for fastening said attachment means relative to a forward portion of the fishing line at said optimum distance from said fishing hook means adapted to be carried at said forward end thereof, said buoyant float member having an effective average density less than the volume of water displaced thereby when floating at the top of a body of water to an extent such as to exert an upward buoyant force adapted to effectively neutralize the downward force adapted to be produced by the action of gravity on said substantial mass of said auxiliary casting weight whereby to cause said buoyant float member to float substantially at said top of said body of water.

References Cited by the Examiner

UNITED STATES PATENTS

| 849,367 | 4/1907 | Burke | 43—43.1 |
| 2,251,721 | 8/1941 | Shepherd | 43—43.1 |
| 2,775,843 | 1/1957 | Leiser | 43—43.14 |

FOREIGN PATENTS

| 1,129,329 | 1956 | France. |
| 14,224 | 1897 | Great Britain. |

SAMUEL KOREN, *Primary Examiner.*

R. L. HOLLISTER, *Assistant Examiner.*